US006996911B1

(12) United States Patent
Dinius

(10) Patent No.: US 6,996,911 B1
(45) Date of Patent: Feb. 14, 2006

(54) COMBINATION LEVEL AND SQUARING TOOL

(76) Inventor: Michael J. Dinius, 5971 S. Oaklands Dr., Tucson, AZ (US) 85746

( * ) Notice: Subject to any disclaimer, the term of this patent is extended or adjusted under 35 U.S.C. 154(b) by 0 days.

(21) Appl. No.: 10/795,195

(22) Filed: Mar. 5, 2004

(51) Int. Cl.
*G01B 5/25* (2006.01)

(52) U.S. Cl. .............................. 33/481; 33/451; 33/371; 33/562

(58) Field of Classification Search .................. 33/1 G, 33/457, 370, 371, 381, 382, 412, 451, 474, 33/480, 481, 529, 562, 613, 645; 403/205
See application file for complete search history.

(56) References Cited

U.S. PATENT DOCUMENTS

| | | | | |
|---|---|---|---|---|
| 586,082 | A | * | 7/1897 | Oyen et al. ..................... 33/481 |
| 715,946 | A | * | 12/1902 | Bennett ........................ 33/382 |
| 1,210,370 | A | * | 12/1916 | Dvorak ........................ 33/451 |
| 1,406,262 | A | * | 2/1922 | Kronert ....................... 33/451 |
| 1,845,801 | A | * | 2/1932 | Kupferman .................. 33/382 |
| 2,213,148 | A | * | 8/1940 | Pyle ............................ 33/451 |
| 2,461,783 | A | * | 2/1949 | Stark ........................... 33/529 |
| 2,607,126 | A | * | 8/1952 | Sekki .......................... 33/529 |
| 2,906,031 | A | * | 9/1959 | Rice ............................ 33/382 |
| 3,499,225 | A | * | 3/1970 | Darrah ........................ 33/480 |
| 3,545,091 | A | * | 12/1970 | Sebastiani ................... 33/382 |
| 3,670,418 | A | * | 6/1972 | Hamiliton, Jr. ............. 33/529 |
| 3,820,249 | A | * | 6/1974 | Stone .......................... 33/382 |
| 3,832,782 | A | | 9/1974 | Johnson et al. |
| 4,010,942 | A | | 3/1977 | Ward |
| 4,168,578 | A | * | 9/1979 | VanderWerf ................ 33/371 |
| 4,183,440 | A | | 1/1980 | Wilkinson |
| 4,367,862 | A | | 1/1983 | McGregor |
| 4,380,872 | A | | 4/1983 | Moran |
| 4,455,013 | A | | 6/1984 | Fischer et al. |
| 4,619,475 | A | | 10/1986 | Sylvest, II |
| 5,205,543 | A | | 4/1993 | Thiede |
| 5,231,766 | A | * | 8/1993 | Pavlak ........................ 33/529 |
| 5,338,015 | A | | 8/1994 | Liegel et al. |
| 5,361,504 | A | * | 11/1994 | Huang ......................... 33/451 |
| 5,439,264 | A | | 8/1995 | Margiottiello |
| 5,518,220 | A | | 5/1996 | Bertrand et al. |
| 5,524,353 | A | * | 6/1996 | Fink ............................ 33/451 |
| 5,570,758 | A | | 11/1996 | Nussbaum |
| 5,816,564 | A | | 10/1998 | Winter |
| 5,956,855 | A | * | 9/1999 | Foss et al. ................... 33/347 |
| 5,992,802 | A | | 11/1999 | Campbell |
| 6,124,935 | A | | 9/2000 | Matthews |

(Continued)

FOREIGN PATENT DOCUMENTS

EP          0 205 343          12/1986

(Continued)

*Primary Examiner*—G. Bradley Bennett
(74) *Attorney, Agent, or Firm*—Quarles & Brady Streich Lang LLP; Gavin J. Milczarek-Desai

(57) ABSTRACT

A square that includes two rigid, channeled members having an interior and an exterior, with the two members being joined at a ninety-degree angle to form a one-piece L-shaped tool having an elbow and a notch disposed on an exterior corner opposite the elbow. The invention also features a bubble level attached to the exterior of each member and a releasable adhesive member disposed upon the interior of each member, such as magnets, tapes, or adhesive plastic materials. Methods for pipe-fitting and for holding pipes or joints in place with the invention are also provided.

13 Claims, 4 Drawing Sheets

U.S. PATENT DOCUMENTS 6,327,786 B1 * 12/2001 Felix .......................... 33/474
6,457,692 B1    10/2002 Gohl, Jr.
6,516,728 B1 *  2/2003 Muller et al. ............... 105/154
6,568,095 B1     5/2003 Snyder

FOREIGN PATENT DOCUMENTS

EP    0 688 687    12/1995
EP    0 852 460     7/1998

* cited by examiner

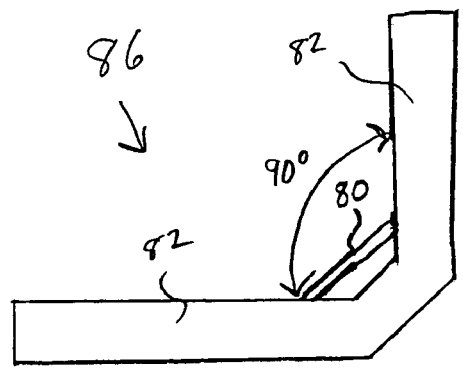
fig. 6
      
fig. 7a    fig. 7b.    fig. 7c    fig. 7d

COMBINATION LEVEL AND SQUARING TOOL

BACKGROUND

1. Field of the Invention

The invention relates in general to the field of hand tools and more particularly to a combination square and level that is especially useful for pipefitting and welding applications.

2. Description of the Related Art

Many different carpenter's squares (or "squaring tools") and pipe fitting tools have been developed over the years. Most of the innovations that have taken place for these tools involve improvements to adjustability, adding functional members (such as a laser-emitting diode), or generally making the tool easier to handle.

For example, U.S. Pat. No. 4,380,872 by Moran discloses a pipe fitter's combination instrument that includes a rigid squaring tool and a slidable carriage means. The slidable carriage means holds an additional rigid bar, thereby imparting a sort of "caliper" function to the tool.

Furthermore, U.S. Pat. No. 3,832,782 issued to Johnson et al., discloses a level with a V-shaped bottom portion, magnets for sticking the level to a pipe, and a groove on the top planer portion of the level in which a "squaring member" may be placed. The "squaring member" illustrated in the figures of this patent consists simply of a standard two-dimensional carpenter's square.

While square and level tools of the related art are useful for their intended purpose, several problems remain. For example, the level of Johnson et al. requires the user to have a separate squaring tool. When used for a pipe-fitting application, the squaring tool may be difficult to locate (i.e., misplaced or lost) or awkward to place in the receiving groove when one is in the middle of a job or is moving around from pipe to pipe. Moreover, the combination instrument of Moran appears to be unnecessarily complicated for basic pipe-fitting applications, has multiple parts that can wear out or break, and cannot assist a user in holding a pipe in place during fitting or joint attachment (e.g., during welding).

In view of the above, it would be desirable to have an all-in-one tool that simultaneously provides a level and squaring function, that is especially useful for pipe-fitting applications, and that provides a holding function.

SUMMARY OF THE INVENTION

The invention relates in general to a tool that in various embodiments provides a squaring, leveling, and holding function that is especially suitable for pipe-fitting applications. More particularly, the invention includes two rigid, channeled members disposed at a 90 degree angle relative to each other, thereby forming an elbow, and a notch disposed at the exterior corner opposite that of the elbow so that clearance for pipe joints, etc. can be provided.

In one embodiment, the invention includes two channeled members that form a carpenter's square, with the channels having a V-shape and/or a U-shape. In another embodiment, a releasable adhesive member is disposed upon the interior of each channel member. The releasable adhesive member can include magnets (for securing the square to a metal object such as an iron pipe), tapes, and adhesive plastic materials. In a preferred embodiment, the tool of the invention has two U-shaped members that are attached to each other at a 90 degree angle, with each member also possessing a bubble level thereon.

Thus, it is a primary objective of the invention to provide a tool with a squaring, leveling, and holding function.

Further, an object of the invention is to provide a tool that is especially suitable for pipe-fitting applications.

Still another object of the invention is to provide a combination tool that is durable and re-useable, even after welding applications.

Yet another object of the invention is to provide a method for pipe fitting the uses a tool with squaring, leveling, and holding functions.

In accordance with these and other objects there is provided a new and improved square that also can be used as a level and as a pipe-holding tool.

Various other purposes and advantages of the invention will become clear from its description in the specification that follows. Therefore, to the accomplishment of the objectives described above, this invention includes the features hereinafter fully described in the detailed description of the preferred embodiments, and particularly pointed out in the claims. However, such description discloses only some of the various ways in which the invention may be practiced.

BRIEF DESCRIPTION OF THE DRAWINGS

FIG. 6 is a side, elevational view a fourth embodiment of the invention.

FIGS. 7a–7d are front, perspective cut-away views of four different V- or U-shaped channeled members.

DETAILED DESCRIPTION OF THE PREFERRED EMBODIMENTS

The invention generally relates to a square that includes two rigid, channeled members having an interior and an exterior, with the two members being joined at a ninety-degree angle to form a one-piece L-shaped tool having an elbow and a notch disposed upon the exterior corner opposite to the elbow. While the squaring tool aspect of the invention provides an inherent leveling function (e.g., by holding one channeled member against a wall, a roughly level pipe may be held perpendicular to the wall in the second channel member), it also may feature a more precise leveling function through the inclusion of a bubble level attached to the exterior of each member. Preferably, a releasable adhesive member, such as magnets, tapes, or adhesive plastic materials, is disposed upon the interior of each channeled member. Thus, a method for holding pipes or joints in place with the invention is also provided.

Figure 1:
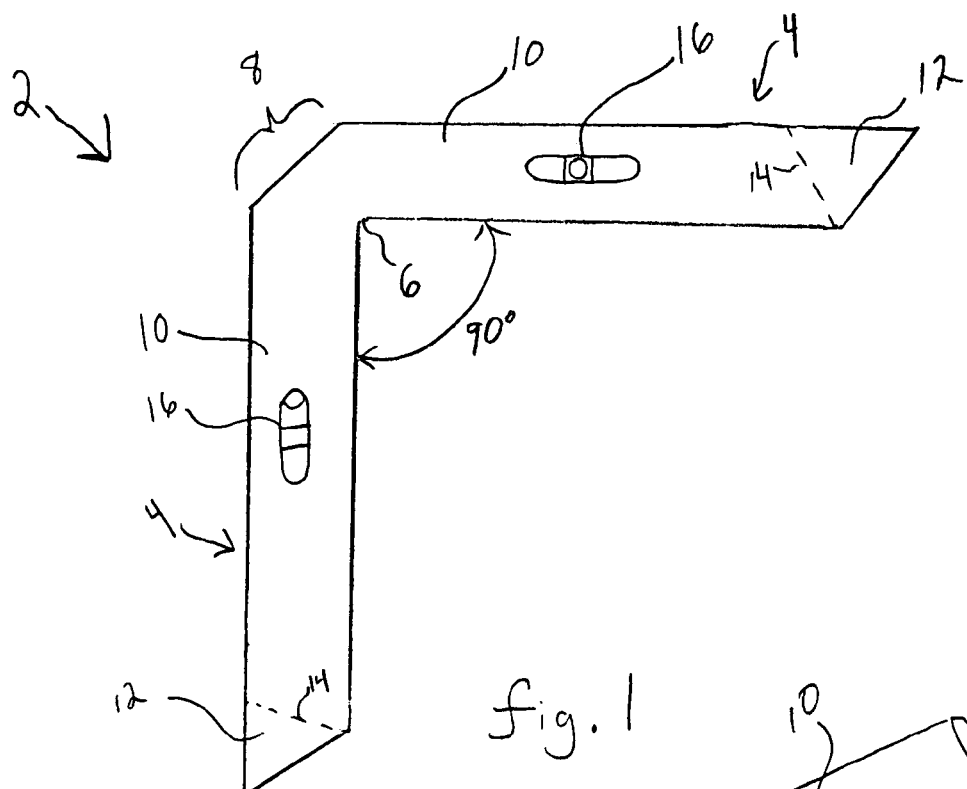
FIG. 1 is a schematic, side elevational view of a first embodiment of the invention.

Turning to FIG. 1, a first embodiment of the tool 2 includes two rigid, channeled members 4 joined at a ninety-degree angle to define an elbow 6. Disposed upon the exterior corner opposite to the elbow 6 is notch 8. Notch 8 provides clearance for joints and other obstacles that may be encountered during pipe-fitting or other job applications. Each rigid, channeled member 4 includes an exterior 10 and an interior 12 (which is defined in this view by phantom line 14). Preferably, a bubble level 16 is provided on each channeled member 4 for precise leveling applications.

Figure 2:
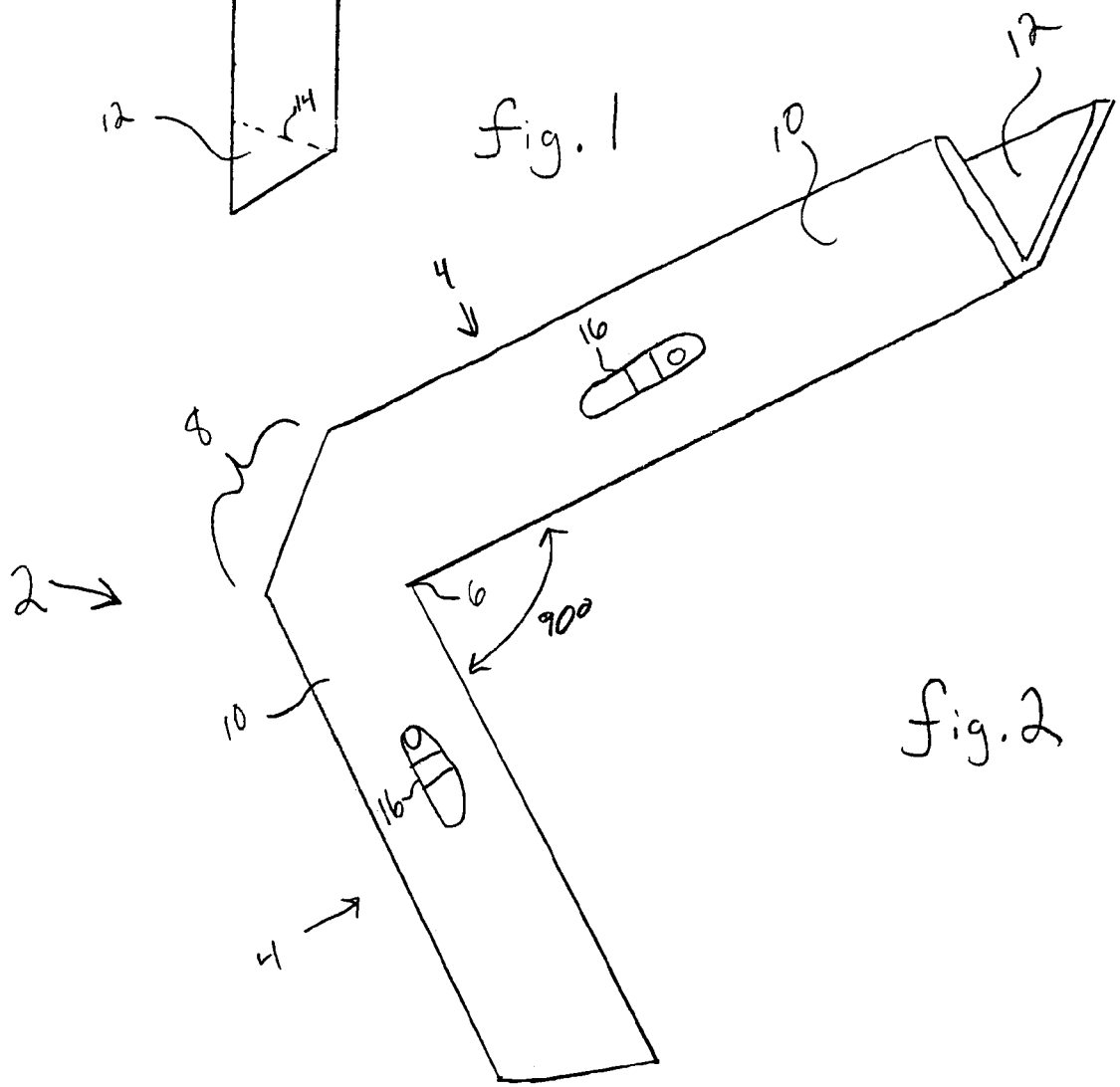
FIG. 2 is a perspective view of the embodiment shown in FIG. 1.

FIG. 2 illustrates a perspective view of the embodiment in FIG. 1, with like numerals designating like structural features. Interior 12 of rigid, channeled member 4 provides an area that is adapted to receive a pipe or similar structure (not shown, see FIGS. 3–5). The rigid, channeled members of the invention are preferably made of metal, such as steel. However, for certain applications, such as work on plastic pipes, the channeled members may be manufactured from a lightweight material such as aluminum or plastic.

Figure 3:
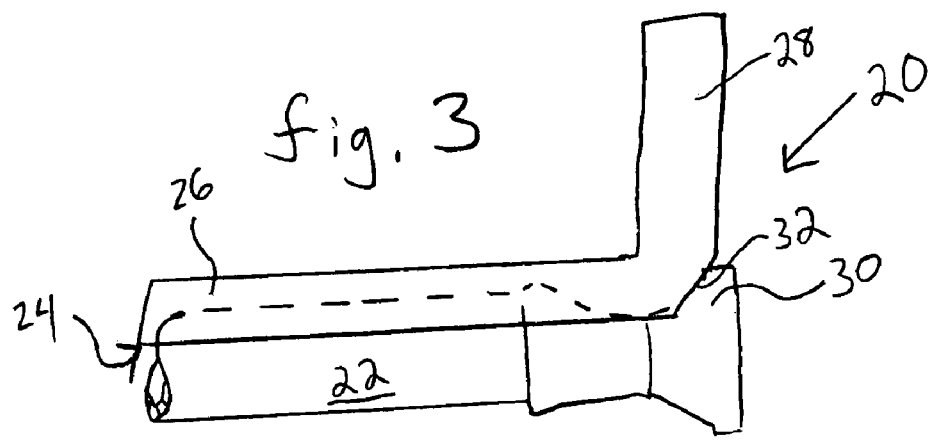
FIG. 3 is a schematic, side elevational view of a second embodiment of the invention.

As shown in FIG. 3, an embodiment of the tool 20 receives a pipe 22 in the interior 24 of channeled member 26. Channeled member 28 can then be used as a squaring tool to guide the proper placement of flange 30, which fits within the area defined by notch 32 without impacting the ability of channeled member 26 to set flush upon pipe 22.

Figure 4:
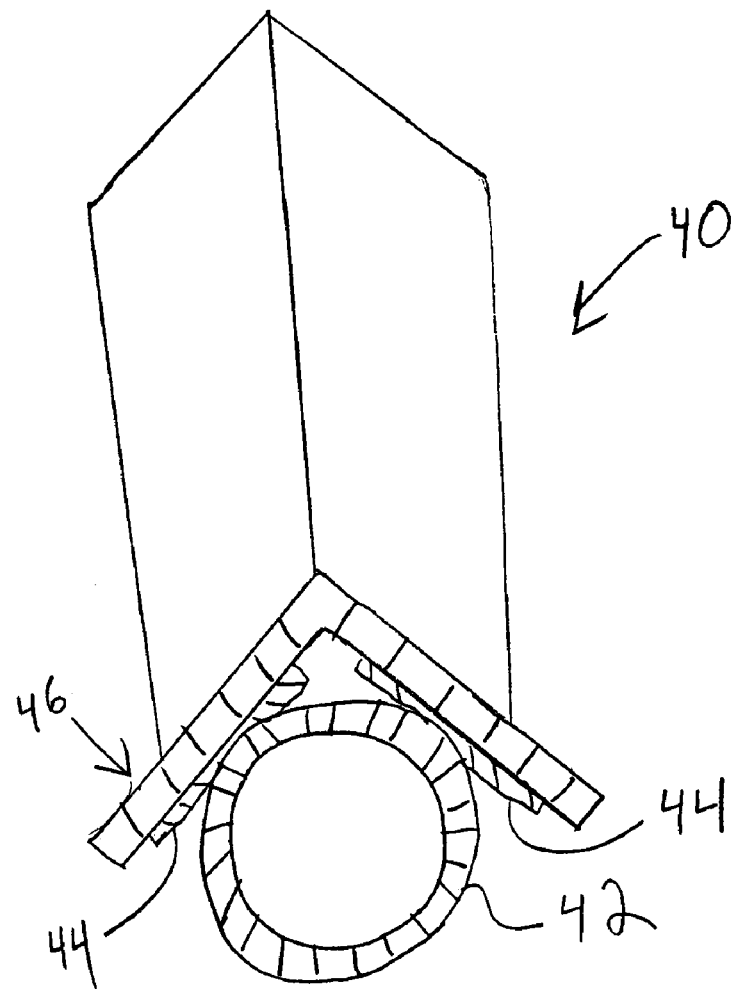
FIG. 4 is a perspective, front cut-away view of a third embodiment of the invention placed upon a pipe.

Turning to FIG. 4, a cut-away perspective view of an embodiment of the tool 40 is shown atop a pipe 42. Preferably, releasable adhesive members 44 are disposed upon rigid, channeled member 46 to aid in securing the tool 40 to the pipe 42. Releasable adhesive members 44 that can be used with the invention may be selected accordingly to a particular application. For example, magnets may be used to attach the tool of the invention to an iron pipe, as well as to hold a pipe in place during joining. For pipes made from other materials, such as polyvinyl chloride, chemically-compatible adhesive tapes or plastic materials may be disposed upon the interior of the channeled members for pipe fitting and holding uses. Examples of commonly available releasable adhesive tape and plastic materials include 3M Wallsaver Removable Poster Tape and the putty-like compound sold under the trademark BLU TAK by BostikFindley, respectively.

Figure 5:
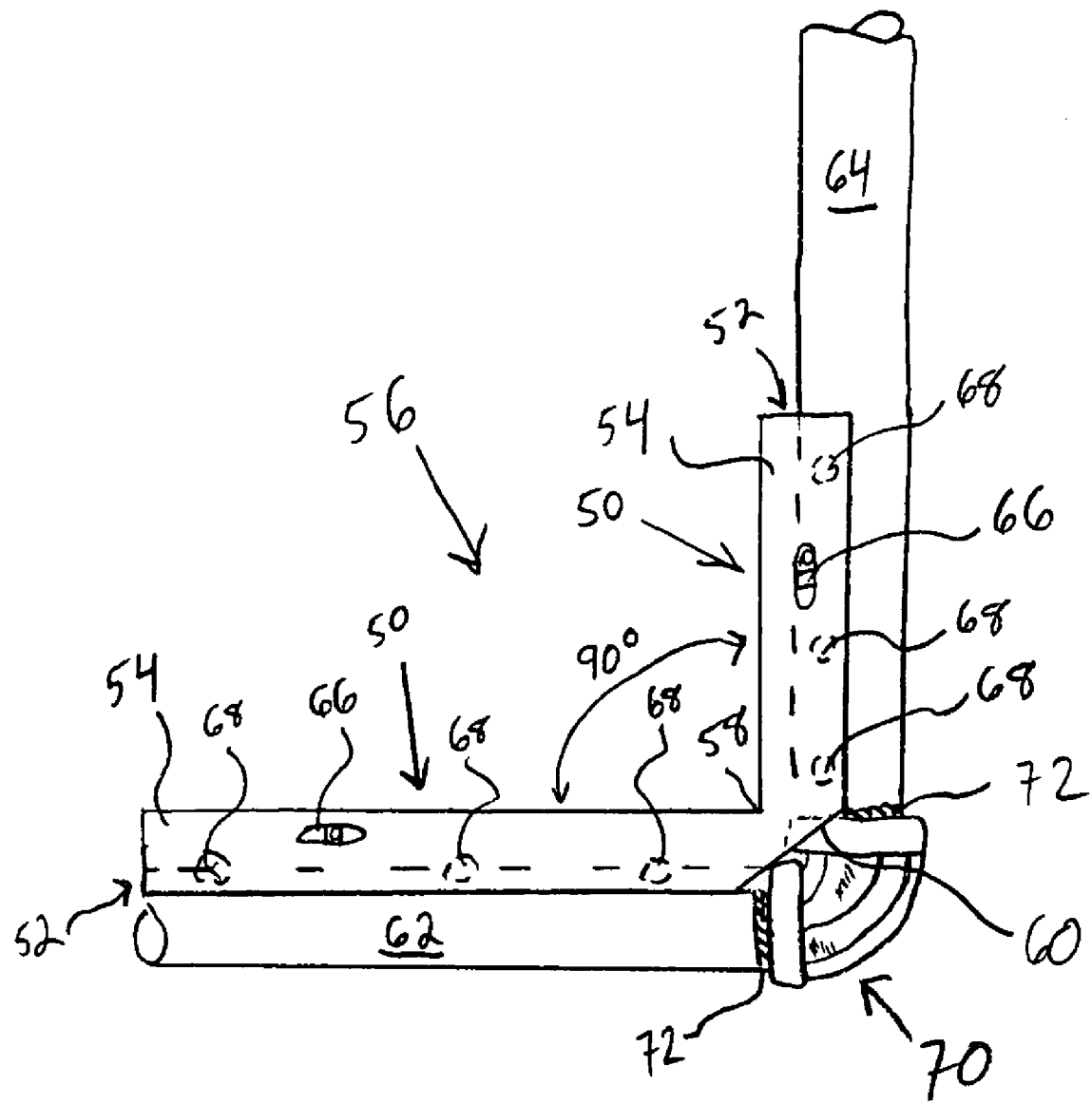
FIG. 5 is a side, elevational view of the embodiment of FIG. 1 in use during the preferred pipe-fitting method.

As illustrated in FIG. 5, a pipe-fitting and a pipe-holding method is also described. Preferably, either method is accomplished by (a) providing two rigid, channeled members 50 having an interior 52 and an exterior 54, wherein the members 50 are joined at a ninety-degree angle to form a one-piece L-shaped tool 56 having an elbow 58 and a notch 60 disposed upon the exterior corner opposite the elbow 58; (b) contacting said interior 52 of one of the rigid, channeled members 50 to a first pipe 62; and (c) contacting the interior 52 of the second rigid, channeled member 50 to a second pipe 64.

Preferably, bubble levels 66 are also disposed upon each channeled member 50. Moreover, releasable adhesive members, such as magnets 68, hold the pipes 62 and 64 in place while a joint 70 is attached (e.g., welded into place) along areas 72. Of course, if PVC pipes or other objects are being worked upon, a chemically compatible, releasable adhesive tape or plastic material may be used in lieu of magnets to hold those pipes or objects in place.

Various changes in the details and components that have been described may be made by those skilled in the art within the principles and scope of the invention herein described in the specification and defined in the appended claims. As seen in FIG. 6. a stabilizing bracket 80 disposed upon and connecting the exterior 82 of each channel member 84 of tool 86 may be added for applications that require heavy-duty use. Moreover, as shown in FIGS. 7a–7d, the channels of each rigid, channeled member of the invention may be made in a variety of V- and U-shaped designs that are especially useful for receiving pipes and other objects.

Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent processes and products.

What is claimed is:

1. A pipe-fitting method, comprising:
   a providing two rigid, channeled members having an interior and an exterior, wherein said members are joined at a ninety-degree angle to form a one-piece L-shaped tool having an elbow and an exterior corner, including a notch disposed upon the exterior corner opposite said elbow of said members, and further have a releasable adhesive member disposed upon said interior of said members,
   b. adhering said interior of one of said rigid, channeled members to a first pipe; and
   c. adhering said interior of a second of said rigid, channeled members to a second pipe.

2. The method of claim 1, wherein each of said rigid, channel members further includes a bubble level.

3. The method of claim 1, wherein said releasable adhesive member comprises a magnet.

4. The method of claim 1, wherein said releasable adhesive member is selected from the group consisting of tapes and adhesive plastic materials.

5. The method of claim 1, wherein said two rigid, channeled members are selected from the group consisting of U-shaped channels and V-shaped channels.

6. The method of claim 1, further including a bracket connecting the exterior of said two rigid, channel members to each other.

7. A tool, comprising:
   two rigid, channeled members joined at a ninety-degree angle to form a one-piece L-shaped tool adapted for placement over two segments of pipe; said tool including a notch disposed upon an exterior corner of the tool adapted to accommodate a joint coupling the segments of pipe placed in said rigid, channeled members.

8. The tool of claim 7, wherein an interior of said two rigid, channeled members further includes a releasable adhesive member disposed thereon.

9. The tool of claim 7, wherein each of said rigid, channel members further includes a bubble level.

10. The tool of claim 8, wherein said releasable adhesive member comprises a magnet.

11. The tool of claim 8, wherein said releasable adhesive member is selected from the group consisting of tapes and adhesive plastic materials.

12. The tool of claim 7, wherein said two rigid, channeled members are selected from the group consisting of U-shaped channels and V-shaped channels.

13. The tool of claim 7, further including a bracket connecting the exterior of said two rigid, channel members to each other.

* * * * *